(12) United States Patent
Hoffman et al.

(10) Patent No.: US 12,053,832 B2
(45) Date of Patent: Aug. 6, 2024

(54) CHAINSAWS

(71) Applicant: TECHTRONIC CORDLESS GP, Anderson, SC (US)

(72) Inventors: Ronald J. Hoffman, Iva, SC (US); Christopher Holman, Clemson, SC (US); Scott Reed, Pelzer, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 0 days.

(21) Appl. No.: 17/590,395

(22) Filed: Feb. 1, 2022

(65) Prior Publication Data

US 2022/0241878 A1    Aug. 4, 2022

Related U.S. Application Data

(60) Provisional application No. 63/145,276, filed on Feb. 3, 2021.

(51) Int. Cl.
  *B23D 57/02* (2006.01)
  *B27B 17/14* (2006.01)

(52) U.S. Cl.
  CPC .......... *B23D 57/023* (2013.01); *B27B 17/14* (2013.01)

(58) Field of Classification Search
  CPC ........ B27B 17/14; B23D 57/02; B23D 57/023
  See application file for complete search history.

(56) References Cited

U.S. PATENT DOCUMENTS

| | | | |
|---|---|---|---|
| 2,109,702 A | 3/1938 | Lange | |
| 3,435,859 A * | 4/1969 | Walker | B27B 17/14 83/818 |
| 4,315,370 A | 2/1982 | Horne | |
| 5,144,751 A * | 9/1992 | Weber | B27B 17/14 30/386 |
| 5,528,835 A | 6/1996 | Ra | |
| 5,896,670 A | 4/1999 | Gibson et al. | |
| 6,032,373 A * | 3/2000 | Peterson | B27B 17/14 30/386 |
| 6,612,952 B1 | 9/2003 | Simpson | |
| 6,877,233 B1 | 4/2005 | Franke | |
| 6,944,958 B1 | 9/2005 | King | |
| 7,185,437 B2 | 3/2007 | Behbahany | |
| 7,527,572 B2 | 5/2009 | Sato | |
| 7,823,653 B2 | 11/2010 | Meixner | |
| 8,220,166 B2 | 7/2012 | Fisher | |

(Continued)

FOREIGN PATENT DOCUMENTS

| | | |
|---|---|---|
| CN | 1316944 A | 10/2001 |
| CN | 2715900 Y | 8/2005 |

(Continued)

OTHER PUBLICATIONS

Chinese Office Action Corresponding with Application No. 202210120178.4 on Sep. 30, 2022 (1 page).

(Continued)

*Primary Examiner* — Evan H MacFarlane

(74) *Attorney, Agent, or Firm* — Dority & Manning, P.A.

(57) ABSTRACT

A chainsaw includes a housing, a motor, a bar fixedly coupled to the housing and configured to form a cutting track, a cutting implement configured to move along the cutting track and drivable by the motor, and a tensioning system configured to adjust tension in the cutting implement.

13 Claims, 5 Drawing Sheets

(56) References Cited

U.S. PATENT DOCUMENTS

| | | | |
|---|---|---|---|
| 8,371,973 B2 | 2/2013 | Sato | |
| 8,595,943 B2 | 12/2013 | Buttery | |
| 8,763,260 B2 | 7/2014 | Ranieri | |
| 9,381,666 B1* | 7/2016 | Moody | B27B 17/02 |
| 9,623,584 B2 | 4/2017 | Sirkka | |
| 9,702,441 B2 | 7/2017 | Kurematsu | |
| 10,107,368 B2 | 10/2018 | Onimaru | |
| 2009/0163319 A1* | 6/2009 | Janasek | B60W 10/02 |
| | | | 701/50 |
| 2011/0167650 A1* | 7/2011 | Buttery | F16D 7/04 |
| | | | 30/386 |
| 2013/0345003 A1 | 12/2013 | Maag | |
| 2015/0135542 A1 | 5/2015 | Cook | |
| 2018/0141238 A1 | 5/2018 | Bonomi | |
| 2020/0198031 A1 | 6/2020 | Schriever | |

FOREIGN PATENT DOCUMENTS

| | | | |
|---|---|---|---|
| CN | 2822917 Y | 10/2006 | |
| CN | 101758520 A | 6/2010 | |
| CN | 101863055 A | 10/2010 | |
| CN | 201702820 U | 1/2011 | |
| CN | 201941047 U | 8/2011 | |
| CN | 102430810 B | 5/2012 | |
| CN | 102562976 A | 7/2012 | |
| CN | 202326950 U | 7/2012 | |
| CN | 202431861 U | 9/2012 | |
| CN | 202746523 U | 2/2013 | |
| CN | 103386508 A | 11/2013 | |
| CN | 103596734 A | 2/2014 | |
| CN | 204075378 U | 1/2015 | |
| CN | 105946061 A * | 9/2016 | A01G 23/091 |
| CN | 106171827 A | 12/2016 | |
| CN | 106238820 B | 12/2016 | |
| CN | 106475633 A | 3/2017 | |
| CN | 206061714 U | 4/2017 | |
| CN | 107234674 A | 10/2017 | |
| CN | 107322695 A | 11/2017 | |
| CN | 207105126 U | 3/2018 | |
| CN | 207735685 U | 8/2018 | |
| CN | 208575966 U | 3/2019 | |
| CN | 208734822 U | 4/2019 | |
| CN | 109877916 A | 6/2019 | |
| CN | 208929344 U | 6/2019 | |
| CN | 209533588 U | 10/2019 | |
| CN | 209774884 U | 12/2019 | |
| CN | 110640843 A | 1/2020 | |
| CN | 110788938 A | 2/2020 | |
| CN | 111109040 A | 5/2020 | |
| CN | 210435477 U | 5/2020 | |
| CN | 211135762 U | 7/2020 | |
| CN | 211362619 U | 8/2020 | |
| CN | 211362620 U | 8/2020 | |
| CN | 211362621 U | 8/2020 | |
| CN | 211362622 U | 8/2020 | |
| CN | 211662218 U | 10/2020 | |
| CN | 211671721 U | 10/2020 | |
| DE | 102018121838 A1 | 3/2020 | |
| EP | 1440777 B1 | 7/2004 | |
| EP | 2036688 A2 | 3/2009 | |
| EP | 2445687 B1 | 5/2012 | |
| EP | 2933074 A1 | 10/2015 | |
| EP | 3135447 A1 | 3/2017 | |
| WO | WO9809041 A1 | 3/1998 | |
| WO | WO2011155880 A1 | 12/2011 | |
| WO | WO2019222249 A2 | 11/2019 | |
| WO | WO2020224266 A1 | 11/2020 | |

OTHER PUBLICATIONS

European Search Report Corresponding with Application No. EP22152428 on Jun. 3, 2022 (1 page).

Australian Office Action Corresponding with Application No. 2022200435 on Feb. 28, 2023 (1 page).

* cited by examiner

CHAINSAWS

FIELD

The present disclosure relates generally to chainsaws, and more particularly to chainsaw tensioners.

BACKGROUND

Chainsaws typically utilize cutting chains which include a string of links each having one or more sharpened edges. The string of links is connected to form a continuous blade which, when introduced against a surface and driven by a driving motor, can cut into the surface so as to cut through the surface.

Over prolonged usage, the continuous blade can stretch. That is, the length of the string of links can become greater. As a result, the continuous blade may sag. Sagging in the continuous blade can result in performance reduction, the continuous blade jumping from the underlying bar, and decreased operational safety. To prevent sagging, operators typically must adjust the position of the underlying bar relative to the driving motor. This operation can be difficult due to worn components. Moreover, this manual operation is time intensive and requires that the operator carry special tools such as wrenches. Also, the interface formed between the bar and driving motor typically is in the form of a slotted engagement between the bar and housing. This slotted engagement style may reduce the strength of the connection between the bar and housing.

Accordingly, improved chainsaws are desired in the art. In particular, chainsaws which provide improved tensioning systems would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a chainsaw is provided. The chainsaw includes a housing: a motor; a bar fixedly coupled to the housing and configured to form a cutting track: a cutting implement configured to move along the cutting track and drivable by the motor; and a tensioning system configured to adjust tension in the cutting implement.

In accordance with another embodiment, a chainsaw is provided. The chainsaw includes a housing: a motor; a cutting track: a cutting implement configured to move along the cutting track and drivable by the motor: and a tensioning system configured to adjust tension in the cutting implement, wherein the tensioning system comprises a clutch configured to slip prior to the cutting implement exceeding a threshold tension.

In accordance with another embodiment, a method of adjusting tension in a cutting implement of a chainsaw is provided. The method includes adjusting a relative position of a drive sprocket with respect to a bar of the chainsaw, wherein the bar is static with respect to a housing of the chainsaw, and wherein the drive sprocket is configured to drive the cutting implement: and terminating further adjustment of the position of the drive sprocket after reaching a desired tension in the cutting implement.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Figure 1:
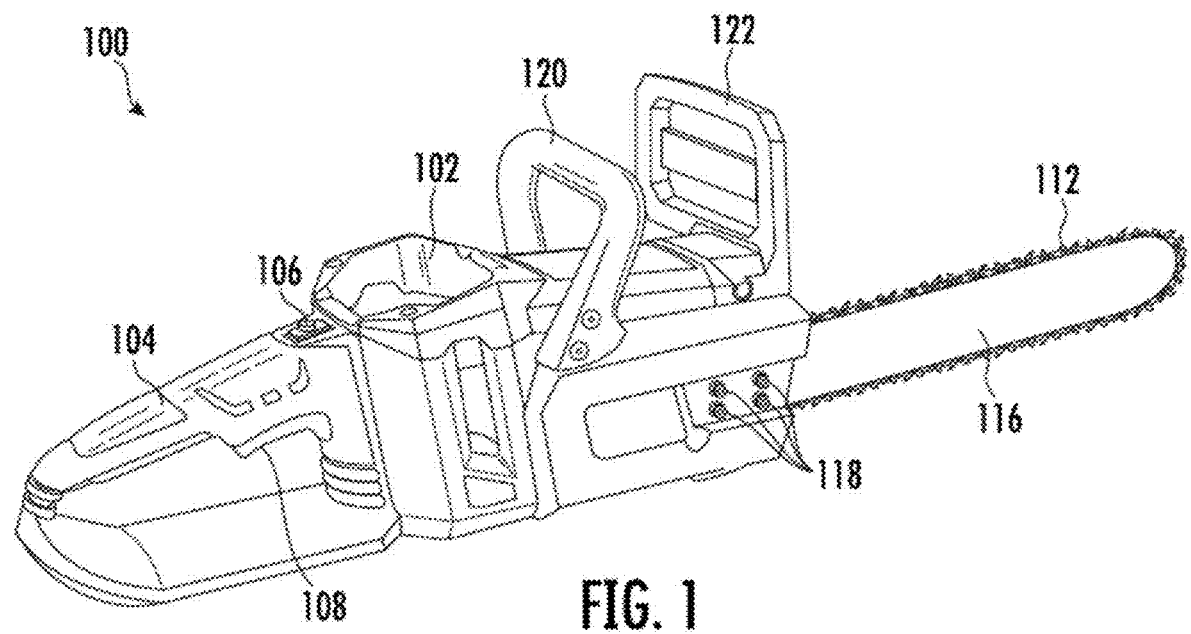
FIG. 1 is perspective view of a chainsaw in accordance with embodiments of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a." "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises." "comprising," "includes." "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present). Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, chainsaws in accordance with one or more embodiments described herein can include a cutting implement, such as a chainsaw chain, configured to move along a cutting track defined by a chainsaw bar. The chainsaw can be configured to adjust tension in the cutting implement without moving the chainsaw bar. Instead, the chainsaw bar can be statically coupled to a housing of the chainsaw. To adjust tension in the cutting implement, a tensioning system can move a drive sprocket interfaced between the motor and the cutting implement. To increase tension, the drive sprocket can be moved in a direction generally away from the cutting implement. Conversely, to decrease tension the drive sprocket can be moved in a direction generally towards the cutting implement. Adjustment of tension can be performed manually or through the use of one or more tension adjusting elements, such as through one or more motors or springs configured to move the drive sprocket. In certain instances, the one or more motors can be controlled by a processor so as to control tension in the cutting implement. Use of proper tension in the cutting implement can prolong effective operational lifetime of the cutting implement, increase safety and even performance of the chainsaw.

In certain instances, adjusting tension in the chainsaw cutting implement can be performed by adjusting the tension past a desired tension to a threshold tension. The tension can then be backed off from the threshold tension to the desired tension. Backing off tension can further prolong effective operational lifetime of the cutting implement, increase safety and even performance of the chainsaw.

In certain instances, adjustment of the tension of the cutting implement can occur while the cutting implement is moving in a reverse direction as compared to an operational direction of the chainsaw. Use of a reverse direction while adjusting tension may prevent the operator from accidently adjusting tension of the cutting implement while actively using the chainsaw in a cutting operation. In certain embodiments, the absolute velocity of the cutting implement may be less during tension adjusting operations as compared to instances when the chainsaw is in use for cutting operations. That is, the continuous blade formed by the cutting implement may move at a slower speed when tensioning is being performed as compared to when the chainsaw is being used in a cutting capacity. These and other advantages and features of the chainsaw will now be described in greater detail below.

Figure 3:
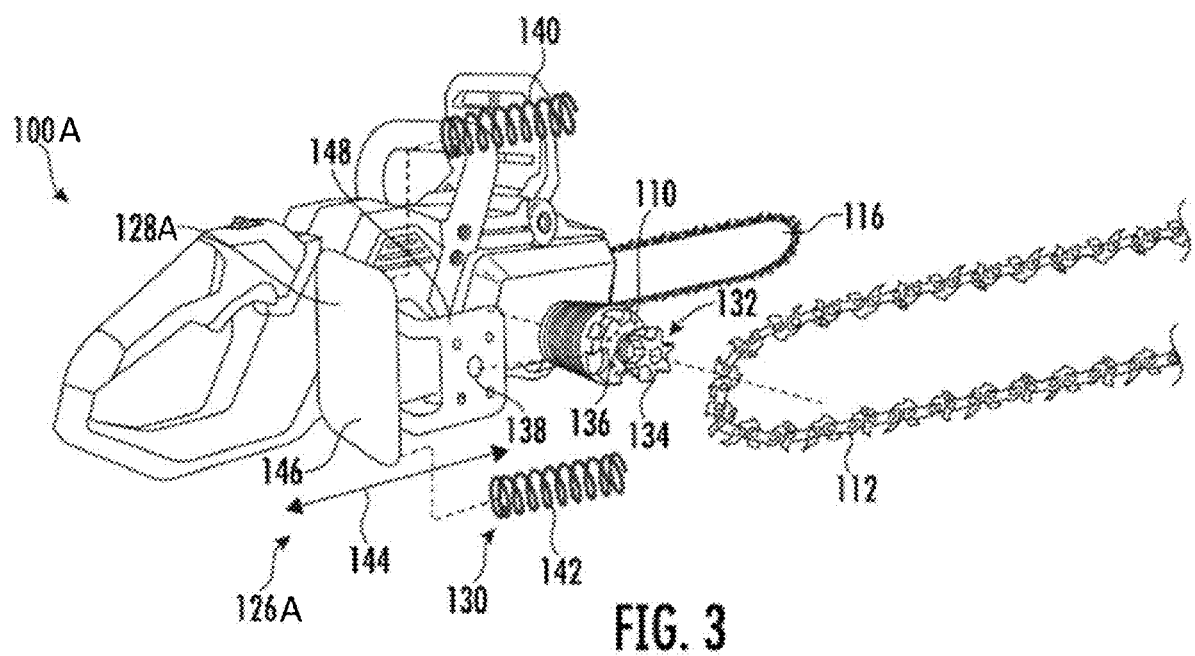
FIG. 3 is a partially exploded perspective view of a chainsaw tensioning system in accordance with embodiments of the present disclosure.

Referring now to the drawings, FIG. 1 illustrates a perspective view of an exemplary chainsaw 100 in accordance with an embodiment described herein. The chainsaw 100 can include a housing 102 defining a handle 104. One or more power features 106 can be used to control the chainsaw 100. For instance, the one or more power features 106 can define an ON/OFF button for the chainsaw 100. A control feature 108 can control the relative speed of a motor 110 (FIG. 3). As the operator increases speed of the motor 110 using the control feature 108, a cutting implement 112 can move at increased speeds in a cutting track 114 formed in a bar 116 of the chainsaw 100. In the illustrated embodiment, the bar 116 is coupled to the housing 102 through fasteners, such as bolts 118. As described in greater detail hereinafter, the coupling point between the bar 116 and housing 102 may be fixed. That is, the coupling point can be static such that the bar 116 and housing 102 do not move relative to one another. In such a manner, adjusting tension of the cutting implement 112 can be performed by a tensioning system described below.

The chainsaw 100 may additionally include one or more secondary handles 120 and one or more guards 122 configured to protect the operator from flying debris, wood chips, and the like which may be scattered, for example, by the cutting implement 112 during operation of the chainsaw.

Figure 2:
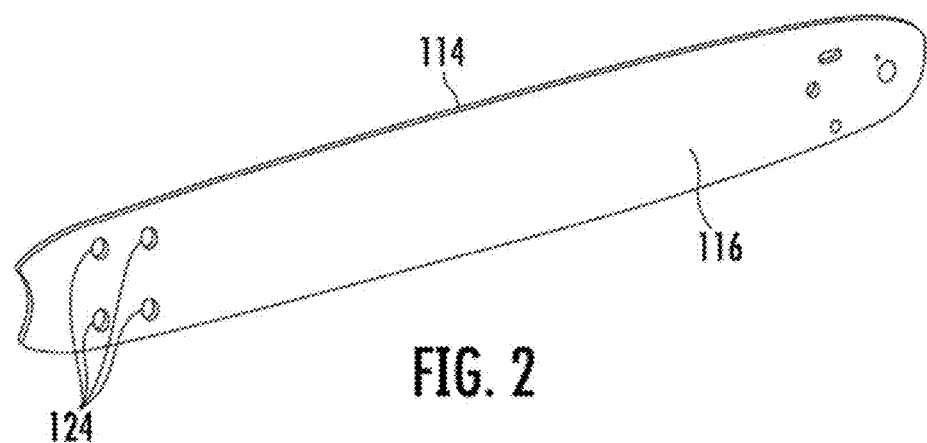
FIG. 2 is a perspective view of a chainsaw bar in accordance with embodiments of the present disclosure.

FIG. 2 illustrates an exemplary view of the bar 116 for use with the chainsaw 100. The bar 116 defines the cutting track 114 along at least a portion of a perimeter thereof. The cutting implement 112 can move relative to the cutting track 114 in an operational direction when used to perform cutting operations. The bar 116 can include one or more fixation points, such as a plurality of holes 124 which allow the bar 116 to be coupled to the housing 104 (directly or through an intermediate member). As depicted in FIG. 2, the holes 124 can be configured to statically couple the bar 116 to the housing 104. For instance, the holes 124 can be single-position holes, i.e., non-elongated holes, which prevent the bar 116 from moving relative to the housing 104. Static coupling between the bar 116 and housing 104 may increase structural integrity of the chainsaw 100, extend operational life of the cutting implement 112 or another component of the chainsaw 100, or otherwise increase safety or performance of the chainsaw 100. By comparison, traditional bars are mounted to the housing through elongated slots which allow for adjustment of tension by loosening the bar relative to the housing and then sliding the bar away from the housing.

To adjust tension of the cutting implement 112, a tensioning system may be utilized. Referring to FIG. 3, in accordance with an exemplary embodiment of the present disclosure, the chainsaw 100A includes a tensioning system 126A generally including a carriage 128A and a tension adjusting element 130 configured to displace the carriage 128A. The carriage 128A can support an interface 132 formed between the motor 110 and the cutting implement 112. The interface 132 can include, for example, a drive sprocket 134 coupled with the motor 110. In an embodiment, the drive sprocket 134 can be supported by the carriage 128A. The motor 110 can be mounted to the carriage 128A such that the drive sprocket 134 moves with the carriage 128A. More specifically, by way of non-limiting example, a shaft 136 extending between the motor 110 and drive sprocket 134 can extend through an opening 138 of the carriage 128A. Accordingly, as the carriage 128A is displaced by the tension adjusting element 130, the drive sprocket 134 can be displaced with respect to the bar 116. Because the cutting implement 112 is tensioned by the combination of the bar 116 and tensioning system 126A, displacing the drive sprocket 134 relative to the bar 116 can change tension within the cutting implement 112.

The exemplary tension adjusting element 130 depicted in FIG. 3 includes springs 140 and 142 configured to adjust (e.g., maintain) tension in the cutting implement 112. The carriage 128A can be configured to move in either direction corresponding with line 144. In an embodiment, the bar 116 can lie along a plane that is parallel, or generally parallel, with the line 144.

The springs 140 and 142 can be configured to impart force along the carriage 128A in the direction of the line 144. In particular, the springs 140 and 142 can bias the carriage 128A in a direction to impart increased tension on the cutting implement 112. That is, as the carriage 128A is moved rearward, for example, by the springs 140 and 142, the drive sprocket 134 can move rearward (i.e., generally away from the cutting implement 112) to increase tension in the cutting implement 112. Conversely, as the carriage 128A moves forward or the cutting implement 112 elongates because of use, tension in the cutting implement 112 can decrease. Thus, controlling tension in the cutting implement 112 can be performed by maintaining pressure along the carriage 128A by the springs 140 and 142.

In an embodiment, the springs 140 and 142 may be configured to engage with a backplate 146 of the carriage 128A. The backplate 146 may be coupled with a portion 148 of the carriage 128A in which the opening 138 is disposed. In certain instances, the backplate 146 may be disposed behind the motor 110, such that the springs 140 and 142 push the backplate 146 away from the motor 110. In other instances, the backplate 146 may be disposed in front of the motor 110, such that the springs 140 and 142 push the backplate 146 in a direction towards the motor 110. In yet other instances, the springs 140 and 142 can be mounted directly to the portion 148 in which the opening 138 is disposed. Other designs and concepts can be utilized without departing from the scope of the disclosure.

In one or more embodiments, the spring rate of at least one of the springs 140 and 142 can be predetermined to maintain a desired tension, or range of tensions, in the cutting implement 112. In certain instances, the springs 140 and 142 can define different spring rates as compared to one another. In other instances, the springs 140 and 142 can have same, or generally same, spring rates as compared to one another. The effective lengths of the springs 140 and 142 may be the same or different as compared to one another. In yet other embodiments, the carriage 128A can be biased by only one spring, such as only spring 140 or only spring 142. Other alternative arrangements and properties of the springs are contemplated herein without departing from the scope of the disclosure.

In certain instances, the springs 140 and 142 can maintain, or attempt to maintain, a constant, or generally constant, tension in the cutting implement through a non-locked interface whereby tension is controlled by a constant, or generally constant, spring pressure generated on the carriage 128A by the springs 140 and 142. In another, non-illustrated embodiment, the carriage 128A can include a locking mechanism (not shown) configured to lock the carriage 128A with respect to the bar 116, the housing 102, or both. The locking mechanism may be selectively activated to selectively induce the biasing force of the springs 140 and 142 on the carriage 128A. When the locking mechanism is locked, the springs 140 and 142 may not displace the carriage 128A. Conversely, when the locking mechanism is unlocked, the springs 140 and 142 may cause the carriage 128A to displace. Thus, the operator can control the tension by selectively moving the locking mechanism between the locked and unlocked states.

Figure 4:
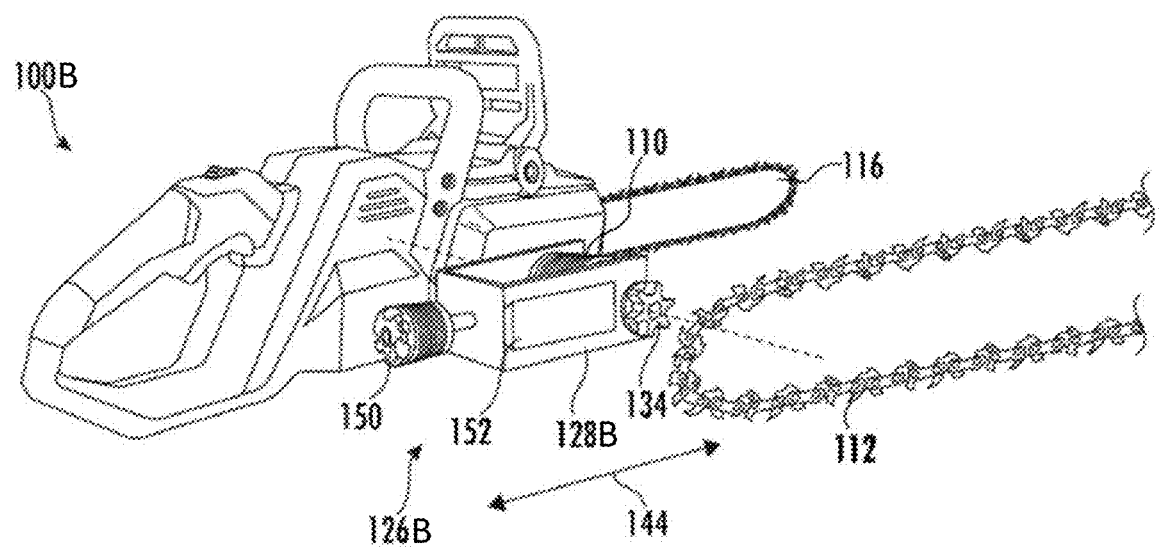
FIG. 4 is a partially exploded perspective view of a chainsaw tensioning system in accordance with embodiments of the present disclosure.

FIG. 4 illustrates an embodiment of the chainsaw 100B where the tensioning system 126B includes a powered element 150 configured to adjust tension of the cutting implement 112. The powered element 150 depicted in FIG. 4 is an electric motor. The powered element 150 can be configured to bias the drive sprocket 134 in directions corresponding with arrow 144. In an embodiment, the carriage 128B can include guides 152 which move along corresponding guides (not shown) of the housing 102, the bar 116, or another member. The powered element 150 can thus move the drive sprocket 134 by moving the carriage 128B along guides 152.

Figure 8:
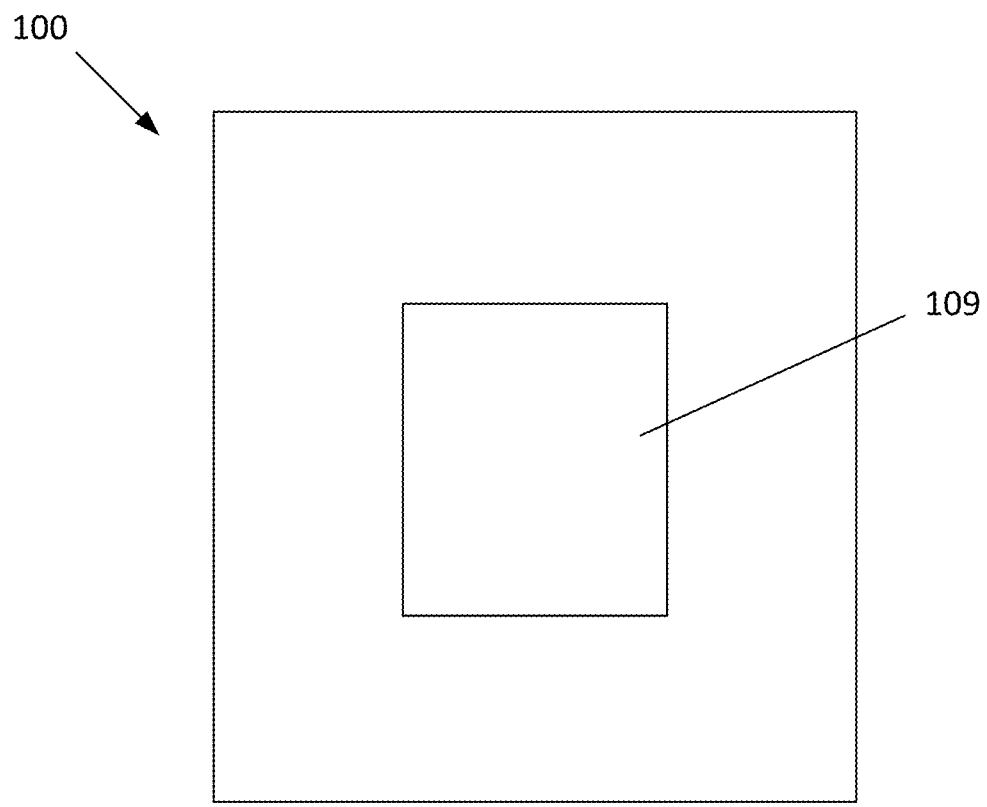
FIG. 8 is a schematic view of a chainsaw in accordance with embodiments of the present disclosure.

The powered element 150 can be controlled by a processor 109 of the chainsaw 100 (see, e.g., FIG. 8) coupled to a memory which is configured to store executable instructions. The executable instructions can be run by the processor 109 to control tension in the cutting implement 112. By way of a first example, the processor 109 can receive information regarding the motor 110, the powered element 150, the drive sprocket 134, or another element of the chainsaw 100B, and determine a current condition, such as a current tension of the cutting implement 112. The processor 109 can further determine a corrective adjustment necessary to reach a desired tension. The processor 109 can then cause the powered element 150 to displace the drive sprocket 134 accordingly to reach the desired tension. In certain embodiments, initial displacement of the drive sprocket 134 can cause the cutting implement 112 to exceed the desired tension. Instead, the cutting implement 112 can be biased to a threshold tension greater than the desired tension and then backed off to the desired tension. This can prevent preloading issues which might otherwise occur if chain tension were not backed off after tightening. In this regard, the tensioning operation can initially overtighten the cutting implement 112 and then reduce tension to reach a desired tension.

Figure 5:
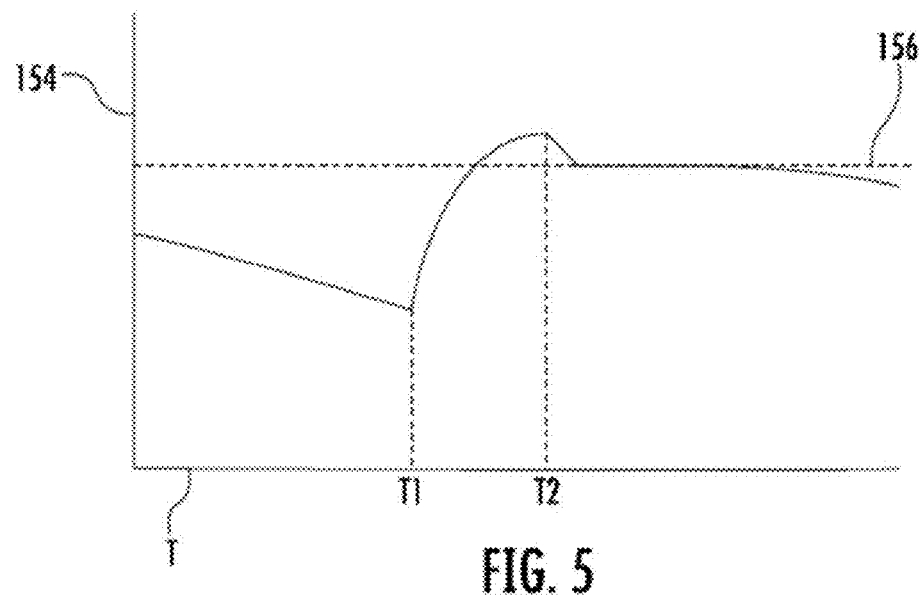
FIG. 5 is a tensioning chart depicting tension of a cutting implement during a tensioning operation performed by a tensioning system in accordance with embodiments of the present disclosure.

Referring to FIG. 5, a tensioning chart 154 is depicted. The tensioning chart 154 illustrates tension in the cutting implement 112 as a function of time T. Over a first period up until time T1, tension in the cutting implement 112 decreases as a result of use. For instance, when cutting large trees with a new blade, tension may decrease as a result of settling which may occur between adjacent links or even within each individual link. At time T1, tension in the cutting implement 112 is adjusted. In certain instances, T1 can occur as a result of operator choice. That is, for example, the operator may selectively control a user actuatable interface to engage the tensioning system 126A, 126B, 126C (FIG. 6), 126D (FIG. 7). In other instances, T1 can occur as a result of detected tension in the cutting implement 112. For example, tensioning may automatically occur when the processor 109 receives information indicating that the tension in the cutting implement 112 is below a prescribed level or range. That is, T1 can occur as a result of automated information. This automated information can be determined through manual input of threshold values, machine learning logic which determines ideal tension on an on-going basis, or the like.

At time T1, the tensioning system 126A, 126B, 126C, 126D can increase tension in the cutting implement 112. In certain instances, tension can be increased linearly. In other instances, tension can be increased in a non-linear manner, such as asymptoticly. The tension can be increased until time T2. Time T2 can occur as a result of reaching the threshold tension of the cutting implement. This threshold tension can be manually input or determined through machine learning logic. The tensioning system 126A, 126B, 126C, 126D can then back off the tension to a desired tension, indicated by dashed line 156. In other embodiments, the tensioning system 126A, 126B, 126C, 126D can immediately go to the desired tension rather than reach the threshold tension at time T2. Moreover, the chart illustrated in FIG. 5 is merely exemplary. Other tensioning profiles may be used without deviating from the scope of the disclosure. After continued use, the tension within the cutting implement may again decrease. The process from T1 to restore the tension to the desired tension 156 can be then be repeated, optionally including increasing tension to the threshold tension at T2.

Figure 6:
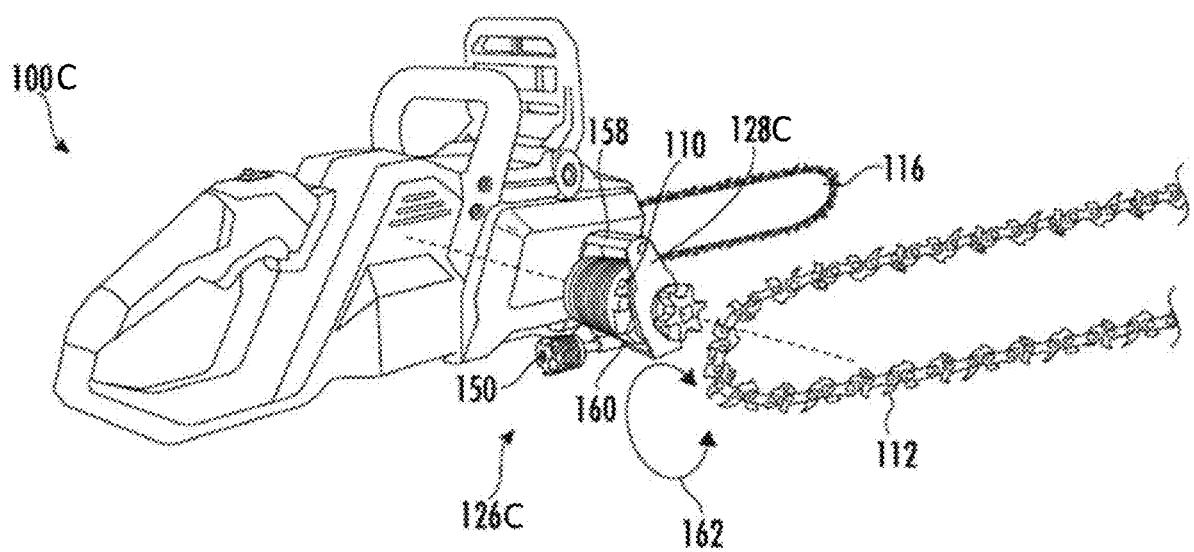
FIG. 6 is a partially exploded perspective view of a chainsaw tensioning system in accordance with embodiments of the present disclosure.
Figure 7:
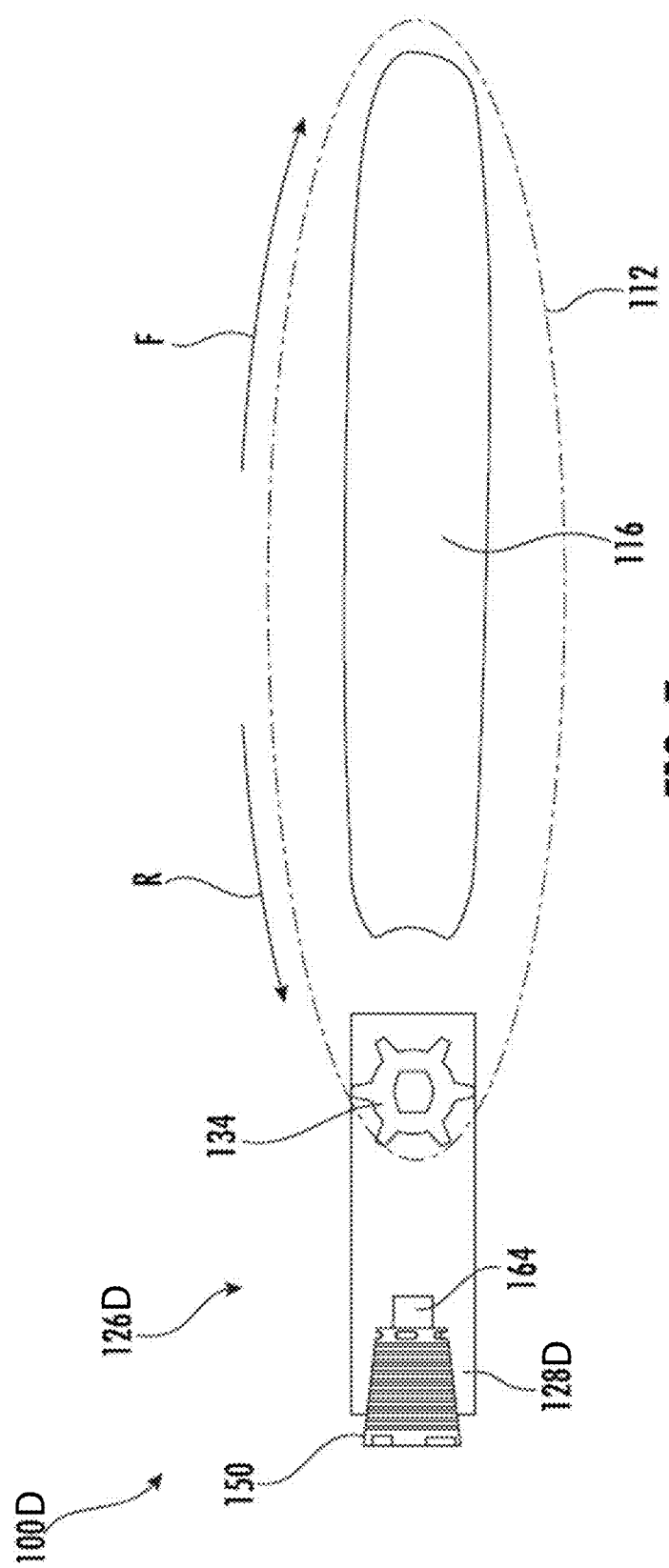
FIG. 7 is a schematic view of a chainsaw tensioning system including a clutch in accordance with embodiments of the present disclosure.

FIG. 6 illustrates an embodiment of the chainsaw 100C where the powered element 150 is configured to adjust tension of the cutting implement 112 through rotation of the carriage 128C. Similar to the embodiment illustrated in FIG. 4, the powered element 150 can include a motor. However, rather than cause the carriage 128C to linearly translate as illustrated in FIG. 4, the powered element 150 illustrated in FIG. 6 rotates the carriage 128C about a pivot axis 158. The powered element 150 can be coupled to the carriage 128C through a hinged tensioner post 160 or the like so as to rotate the carriage 128C in a direction corresponding with line 162 without binding. While the pivot axis 158 illustrated in FIG. 6 is shown above the motor 110, in other embodiments, the pivot axis 158 can be below the motor 110 or along either side thereof.

FIG. 7 illustrates a schematic view of an embodiment of the chainsaw 100D including a clutch 164 configured to slip at a condition indicative of a specified tension in the cutting implement 112. In certain instances, the clutch 164 can be integrated within the powered element 150. In other instances, the clutch 164 can be integrated with the carriage 128D, hinged tensioner post 160, or the like. The clutch 164 can generally be configured to slip upon reaching a specified tension in the cutting implement 112. In some embodiments, the specified tension can correspond with the desired tension of the cutting implement 112, i.e., the operational ready tension. In other embodiments, the specified tension can correspond with threshold tension of the cutting implement 112, i.e., greater tension than the desired tension, whereafter the tension can be backed off to the desired tension. By way of non-limiting example, conditions indicative of desired tension in the cutting implement 112 can include threshold current draw by the powered element 150 or motor 110, acceleration of the carriage 128D, determined load using one or more sensors, and the like. For instance, when the processor 109 (FIG. 8) detects current draw by the powered element 150 exceeding a prescribed value, the processor 109 can determine that tension has reached the specified tension.

It is noted that in certain instances, the cutting implement 112 may move in a reverse direction, e.g., as shown by arrow R, when the tensioning system 126D is actively adjusting tension of the cutting implement 112. In normal operation, the cutting implement 112 may move in the forward direction, e.g., as shown by arrow F.

A method of adjusting tension in a cutting implement of a chainsaw includes a step of adjusting a relative position of a drive sprocket with respect to a bar of the chainsaw. The bar can be static with respect to a housing of the chainsaw. The drive sprocket can be configured to drive the cutting implement. The method can further include a step of terminating further adjustment of the position of the drive sprocket after reaching a desired tension in the cutting implement.

In an embodiment, adjusting the relative position of the drive sprocket is performed by displacing a carriage coupled to the drive sprocket through at least one of linear translation, pivotal rotation, or a combination thereof. Displacement of the carriage can be performed manually or using one or more tension adjusting elements. Exemplary tension adjusting elements include motors or springs.

In certain instances, the step of adjusting the relative position of the drive sprocket can be performed until a clutch integrated into the tension adjusting system slips. Slippage of the clutch can occur when the clutch experiences a condition indicative of a specified tension in the cutting implement, such as a threshold tension in the cutting implement. After the threshold tension is reached, the step of adjusting the relative position of the drive sprocket can include backing off the adjustment from the threshold tension prior to terminating further adjustment of the position of the drive sprocket. As described with respect to FIG. 5, backing tension off from the threshold tension condition can increase operational longevity of the cutting implement and the chainsaw while increasing safety and performance.

Further aspects of the invention are provided by one or more of the following embodiments:

Embodiment 1. A chainsaw comprising: a housing: a motor: a bar fixedly coupled to the housing and configured to form a cutting track: a cutting implement configured to move along the cutting track and drivable by the motor: and a tensioning system configured to adjust tension in the cutting implement.

Embodiment 2. The chainsaw of any one or more of the embodiments, wherein the tensioning system comprises a drive sprocket coupled to the motor and configured to drive the cutting implement, and wherein the drive sprocket is configured to be displaced with respect to the bar.

Embodiment 3. The chainsaw of any one or more of the embodiments, wherein the tensioning system comprises: a carriage: a tension adjusting element configured to displace the carriage: and an interface between the motor and the cutting implement, the interface being configured to adjust a tension of the cutting implement when the carriage is displaced.

Embodiment 4. The chainsaw of any one or more of the embodiments, wherein the tension adjusting element comprises at least one of a spring or a motor.

Embodiment 5. The chainsaw of any one or more of the embodiments, wherein the bar lies along a plane, and wherein the carriage is configured to displace the interface in a direction generally parallel with the plane.

Embodiment 6. The chainsaw of any one or more of the embodiments, wherein the carriage is configured to displace through linear translation, rotation, or a combination thereof.

Embodiment 7. The chainsaw of any one or more of the embodiments, wherein the interface comprises a drive sprocket configured to drive the cutting implement, and wherein the drive sprocket is configured to move when the carriage is displaced.

Embodiment 8. The chainsaw of any one or more of the embodiments, wherein the chainsaw further comprises a user actuatable interface configured to control operation of the tensioning system.

Embodiment 9. A chainsaw comprising: a housing: a motor: a cutting track: a cutting implement configured to move along the cutting track and drivable by the motor; and a tensioning system configured to adjust tension in the cutting implement, wherein the tensioning system comprises a clutch configured to slip prior to the cutting implement exceeding a threshold tension.

Embodiment 10. The chainsaw of any one or more of the embodiments, wherein the chainsaw further comprises a sensor configured to sense the occurrence of slip at the clutch.

Embodiment 11. The chainsaw of any one or more of the embodiments, wherein the cutting implement is driven by a drive sprocket operatively coupled to the motor, wherein the drive sprocket is coupled with a carriage of the tensioning system, and wherein the carriage is displaceable relative to the cutting track and housing by a tensioning element comprising at least one of a spring or motor.

Embodiment 12. The chainsaw of any one or more of the embodiments, wherein the cutting track is defined by a bar statically coupled to the housing. Embodiment 13. A method of adjusting tension in a cutting implement of a chainsaw, the method comprising: adjusting a relative position of a drive sprocket with respect to a bar of the chainsaw, wherein the bar is static with respect to a housing of the chainsaw, and wherein the drive sprocket is configured to drive the cutting implement: and terminating further adjustment of the position of the drive sprocket after reaching a desired tension in the cutting implement.

Embodiment 14. The method of any one or more of the embodiments, wherein adjusting a relative position of the drive sprocket is performed by displacing a carriage coupled to the drive sprocket through at least one of linear translation, pivotal rotation, or a combination thereof.

Embodiment 15. The method of any one or more of the embodiments, wherein displacement of the carriage is performed by a tension adjusting element, and wherein the tension adjusting element comprises at least one of a spring or a motor.

Embodiment 16. The method of any one or more of the embodiments, wherein displacement of the carriage is performed by manually adjusting a location of the carriage.

Embodiment 17. The method of any one or more of the embodiments, wherein the drive sprocket is interfaced with a clutch configured to slip prior to the cutting implement exceeding a threshold tension.

Embodiment 18. The method of any one or more of the embodiments, wherein adjusting the relative position of the drive sprocket is performed until a threshold tension is reached, and wherein adjusting the relative position of the drive sprocket further comprises backing off the adjustment from the threshold tension prior to terminating further adjustment of the position of the drive sprocket.

Embodiment 19. The method of any one or more of the embodiments, further comprising adjusting a speed of the cutting implement to a tension adjusting speed prior to adjusting the relative position of the drive sprocket.

Embodiment 20. The method of any one or more of the embodiments, wherein the tension adjusting speed is in a reverse direction as compared to an operational direction of the chainsaw.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A chainsaw comprising:
    a housing;
    a motor;
    a bar coupled to the housing and configured to form a cutting track;
    a chain configured to move along the cutting track;
    a drive sprocket coupled to the motor to drive the chain; and
    a tensioning system comprising:
        a powered element configured to adjust tension in the chain by rotating the motor about a pivot axis; and
        a clutch between the powered element and the chain, wherein the clutch slips prior to the chain exceeding a threshold tension; and
        a processor that controls the powered element, wherein the processor:
            determines a corrective adjustment to reach a desired tension from a current detected tension, the corrective adjustment including initially overtightening the chain from the current detected tension to the threshold tension and then reducing the tension in the chain to the desired tension; and
            causes the powered element to execute the corrective adjustment by:
                rotating the motor about the pivot axis in a first direction to adjust the tension in the chain from the current detected tension to the threshold tension; and
                rotating the motor about the pivot axis in a second direction opposite the first direction to adjust the tension in the chain from the threshold tension to the desired tension after the clutch slips.

2. The chainsaw of claim 1, wherein the drive sprocket is configured to be displaced with respect to the bar when the powered element adjusts the tension in the chain.

3. The chainsaw of claim 1, wherein the bar lies along a plane, and wherein the powered element is configured to displace the drive sprocket in a direction generally parallel with the plane.

4. The chainsaw of claim 1, wherein the motor is disposed between the powered element and the pivot axis.

5. The chainsaw of claim 1, wherein the drive sprocket is coupled with a carriage, wherein the motor is disposed on a first side of a portion of the carriage, and wherein the drive sprocket is disposed on a second side of the portion of the carriage, the second side being opposite the first side.

6. The chainsaw of claim 1, wherein the bar comprises a plurality of non-elongated holes, and wherein the bar is coupled to the housing through the plurality of non-elongated holes.

7. A chainsaw comprising:
    a housing;
    a motor;
    a cutting track;
    a chain configured to move along the cutting track and drivable by the motor; and
    a tensioning system comprising:
        a powered element configured to adjust tension in the chain by rotating the motor about a pivot axis;

a clutch configured to slip prior to the chain exceeding a threshold tension; and a processor that controls the powered element, wherein the processor:

determines a corrective adjustment to reach a desired tension from a current detected tension, the corrective adjustment including initially overtightening the chain from the current detected tension to the threshold tension and then reducing the tension in the chain to the desired tension;

causes the powered element to rotate the motor about the pivot axis in a first direction to adjust the tension in the chain to the threshold tension according to the corrective adjustment;

causes the powered element to rotate the motor about the pivot axis in a second direction opposite the first direction according to the corrective adjustment to adjust the tension in the chain from the threshold tension to the desired tension after the clutch slips.

8. The chainsaw of claim 7, wherein the chain is driven by a drive sprocket operatively coupled to the motor, and wherein the drive sprocket is coupled with a carriage.

9. The chainsaw of claim 7, wherein the cutting track is defined by a bar coupled to the housing.

10. The chainsaw of claim 7, wherein the tensioning system further comprises a carriage supporting the motor, wherein the carriage moves relative to the housing.

11. The chainsaw of claim 7, wherein the motor is disposed between the powered element and the pivot axis.

12. The chainsaw of claim 7, wherein the chain is driven by a drive sprocket operatively coupled to the motor, wherein the drive sprocket is coupled with a carriage, wherein the motor is disposed on a first side of a portion of the carriage, and wherein the drive sprocket is disposed on a second side of the portion of the carriage, the second side being opposite the first side.

13. A chainsaw comprising:

a housing;

a motor;

a cutting track;

a chain driven by the motor along the cutting track during a cutting operation; and a tensioning system comprising a processor and a powered element, wherein the processor controls the powered element to adjust tension in the chain by:

determining a corrective adjustment to reach a desired tension from a current detected tension, the corrective adjustment including initially overtightening the chain from the current detected tension to a threshold tension and then reducing the tension in the chain to the desired tension;

causing the powered element to execute the corrective adjustment by:

rotating the motor about a pivot axis in a first direction to adjust the tension in the chain from the current detected tension to the threshold tension; and rotating the motor about the pivot axis in a second direction opposite the first direction to adjust the tension in the chain from the threshold tension to the desired tension.

\* \* \* \* \*